United States Patent
Harris et al.

(10) Patent No.: US 10,162,683 B2
(45) Date of Patent: Dec. 25, 2018

(54) WEIGHTED STEALING OF RESOURCES

(71) Applicant: International Business Machines Corporation, Armonk, NY (US)

(72) Inventors: Ryan P. Harris, Fenton, MI (US); Jeffrey A. Miller, Jr., Berkeley, CA (US); Olumayokun J. Obembe, Belleville, MI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/296,999

(22) Filed: Jun. 5, 2014

(65) Prior Publication Data
US 2015/0355943 A1    Dec. 10, 2015

(51) Int. Cl.
*G06F 9/50*    (2006.01)

(52) U.S. Cl.
CPC .................. *G06F 9/5083* (2013.01)

(58) Field of Classification Search
CPC ........................................ G06F 9/50
USPC ........................................ 718/104
See application file for complete search history.

(56) References Cited

U.S. PATENT DOCUMENTS

| | | | | |
|---|---|---|---|---|
| 5,404,521 A * | 4/1995 | Murray | ................... | G06F 8/451 718/104 |
| 5,442,730 A * | 8/1995 | Bigus | ................... | G06F 9/4881 706/19 |
| 6,651,125 B2 * | 11/2003 | Maergner | ............. | G06F 9/5027 710/244 |
| 6,711,607 B1 * | 3/2004 | Goyal | ................... | G06F 9/5044 709/203 |
| 6,775,231 B1 | 8/2004 | Baker et al. | | |
| 6,970,709 B1 * | 11/2005 | Williams | ............. | H04W 88/08 455/450 |
| 7,015,913 B1 * | 3/2006 | Lindholm | ............. | G06F 9/3851 345/501 |
| 7,051,188 B1 * | 5/2006 | Kubala et al. | .................. | 712/29 |
| 7,117,497 B2 | 10/2006 | Miller et al. | | |
| 7,225,223 B1 * | 5/2007 | McCarthy | ............. | G06F 9/5005 709/201 |
| 7,342,929 B2 * | 3/2008 | Bremler-Barr | ...... | H04L 12/2602 370/395.4 |
| 7,793,297 B2 | 9/2010 | Aggarwal et al. | | |
| 7,843,873 B2 * | 11/2010 | Tzavidas | ............... | H04W 72/10 370/329 |
| 8,036,372 B2 * | 10/2011 | Patakula | ............. | H04M 3/5233 379/265.11 |

(Continued)

OTHER PUBLICATIONS

G. Geeraerts, A. Heußner and J. Raskin, "Queue-Dispatch Asynchronous Systems," 2013 13th International Conference on Application of Concurrency to System Design, Barcelona, 2013, pp. 150-159. (Year: 2013).*

(Continued)

*Primary Examiner* — Andrew M. Lyons
(74) *Attorney, Agent, or Firm* — Andrew Aubert; David B. Woycechowsky; Stephen Darrow

(57) ABSTRACT

In a computer system with multiple job queues and limited resources, an initial allocation of resources is given to each job queue. The utilization of these initially allocated resources is monitored, and queues with excess resources may have those resources stolen and temporarily redistributed to queues with unmet resource needs.

12 Claims, 4 Drawing Sheets

(56) References Cited

U.S. PATENT DOCUMENTS

| | | | | |
|---|---|---|---|---|
| 8,037,475 | B1* | 10/2011 | Jackson | G06F 9/5027 709/224 |
| 8,094,555 | B2 | 1/2012 | Ward et al. | |
| 8,261,029 | B1* | 9/2012 | Marshak | G06F 3/0613 370/444 |
| 8,279,786 | B1* | 10/2012 | Smith | H04W 16/14 370/310 |
| 8,458,712 | B2* | 6/2013 | Chan | G06F 9/4881 718/103 |
| 8,615,764 | B2* | 12/2013 | Salapura et al. | 718/104 |
| 9,262,226 | B2* | 2/2016 | Gokhale | G06F 9/5016 |
| 9,465,663 | B2* | 10/2016 | Mincarelli | G06F 9/485 |
| 2002/0052909 | A1* | 5/2002 | Seeds | G06F 9/5055 718/104 |
| 2002/0133530 | A1 | 9/2002 | Koning | |
| 2003/0225815 | A1* | 12/2003 | Brenner | G06F 9/5088 718/106 |
| 2005/0210472 | A1* | 9/2005 | Accapadi | G06F 9/5033 718/105 |
| 2006/0075405 | A1* | 4/2006 | Sinha | G06F 9/5033 718/100 |
| 2006/0123423 | A1* | 6/2006 | Brenner | G06F 9/5083 718/105 |
| 2008/0034366 | A1* | 2/2008 | Tanaka | G06F 9/5077 718/1 |
| 2008/0235695 | A1* | 9/2008 | Itou | G06F 9/4881 718/103 |
| 2008/0276262 | A1* | 11/2008 | Munshi | G06F 8/41 719/328 |
| 2009/0025004 | A1* | 1/2009 | Barnard et al. | 718/104 |
| 2009/0165007 | A1* | 6/2009 | Aghajanyan | G06F 9/4881 718/103 |
| 2009/0254907 | A1* | 10/2009 | Neary | G06F 9/5027 718/102 |
| 2009/0320027 | A1* | 12/2009 | Ringseth | G06F 9/4881 718/102 |
| 2010/0115526 | A1* | 5/2010 | Mincarelli | 718/104 |
| 2010/0153962 | A1* | 6/2010 | Tatu | G06F 9/5027 718/105 |
| 2011/0307730 | A1* | 12/2011 | Marshall | G06F 1/3203 713/324 |
| 2012/0096468 | A1* | 4/2012 | Chakravorty | G06F 9/50 718/103 |
| 2012/0221732 | A1* | 8/2012 | Waldspurger | G06F 9/4881 709/226 |
| 2012/0317578 | A1* | 12/2012 | Kansal | G06F 9/5077 718/104 |
| 2013/0007753 | A1* | 1/2013 | Jain | G06F 9/46 718/103 |
| 2013/0061233 | A1 | 3/2013 | Zhou et al. | |
| 2013/0064286 | A1* | 3/2013 | Karlsson | H04N 21/23439 375/240.02 |
| 2013/0125129 | A1* | 5/2013 | Chakravorty | G06F 9/4843 718/104 |
| 2013/0179881 | A1* | 7/2013 | Calder | G06F 9/5072 718/1 |
| 2013/0179895 | A1* | 7/2013 | Calder | G06F 9/5077 718/104 |
| 2014/0068621 | A1* | 3/2014 | Sitaraman | G06F 9/505 718/102 |
| 2014/0099911 | A1* | 4/2014 | Smith | H04W 76/007 455/404.1 |
| 2014/0130048 | A1* | 5/2014 | Soundararajan | G06F 9/5077 718/1 |
| 2014/0380322 | A1* | 12/2014 | Ailamaki | G06F 9/4843 718/102 |
| 2015/0169684 | A1* | 6/2015 | Li | G06F 17/30492 707/718 |
| 2015/0271342 | A1* | 9/2015 | Gupta | H04M 15/60 455/406 |
| 2015/0339168 | A1* | 11/2015 | Mason | G06F 9/5027 718/104 |
| 2015/0347186 | A1* | 12/2015 | Truong | G06F 9/4881 718/103 |

OTHER PUBLICATIONS

H. Wang, I. Koren and C. M. Krishna, "Utilization-Based Resource Partitioning for Power-Performance Efficiency in SMT Processors," in IEEE Transactions on Parallel and Distributed Systems, vol. 22, No. 7, pp. 1150-1163, Jul. 2011. (Year: 2011).*

* cited by examiner

WEIGHTED STEALING OF RESOURCES

BACKGROUND OF THE INVENTION

The present invention relates generally to the field of multitask computing, and more particularly to resource allocation and scheduling in multitask computing.

A computing system resource is any component of limited availability which can be used to perform work. Resources may be physical or virtual, and may include components such as central processing unit (CPU) time, bytes of random access memory, non-volatile storage space, and network bandwidth. Resources may also be fungible, such as a particular quantity of memory or hard drive space, or non-fungible, such as access to a specific memory location.

A thread is a type of resource that works on completing a job. A thread is a set of instructions that can be managed independently of other sets of instructions with respect to scheduling CPU resources. At a high level, multiple threads can be thought of as able to execute concurrently, whether through actual simultaneous execution on multiple processors or processor cores or through the use of time-division multiplexing on a single processor or core.

A queue is a linearly ordered collection of items. Items are generally added to the back of the queue and removed from its front, and, at least conceptually, there is no limit to the number of items a queue can contain. A job queue is a holding position for work that can be passed off into threads. Every thread in a job queue can work on one job at a time, so a job queue can work on as many jobs at the same time as it has threads allocated to it.

SUMMARY

According to three aspects of the present invention, there is a computer program product, system and/or method which performs the following actions (not necessarily in the following order and not necessarily in serial sequence): (i) assigns an initial allocation of resources to each job queue in a plurality of job queues; (ii) monitors utilization of the initially allocated resources; and (iii) responsive to a first job queue in the plurality of job queues not using all of its allocated resources, taking some unused resources from the first job queue and reallocating them to one or more other job queues in the plurality of job queues. At least the monitoring, taking, and reallocating of resources are performed by computer software running on computer hardware.

DETAILED DESCRIPTION

Figure 1:
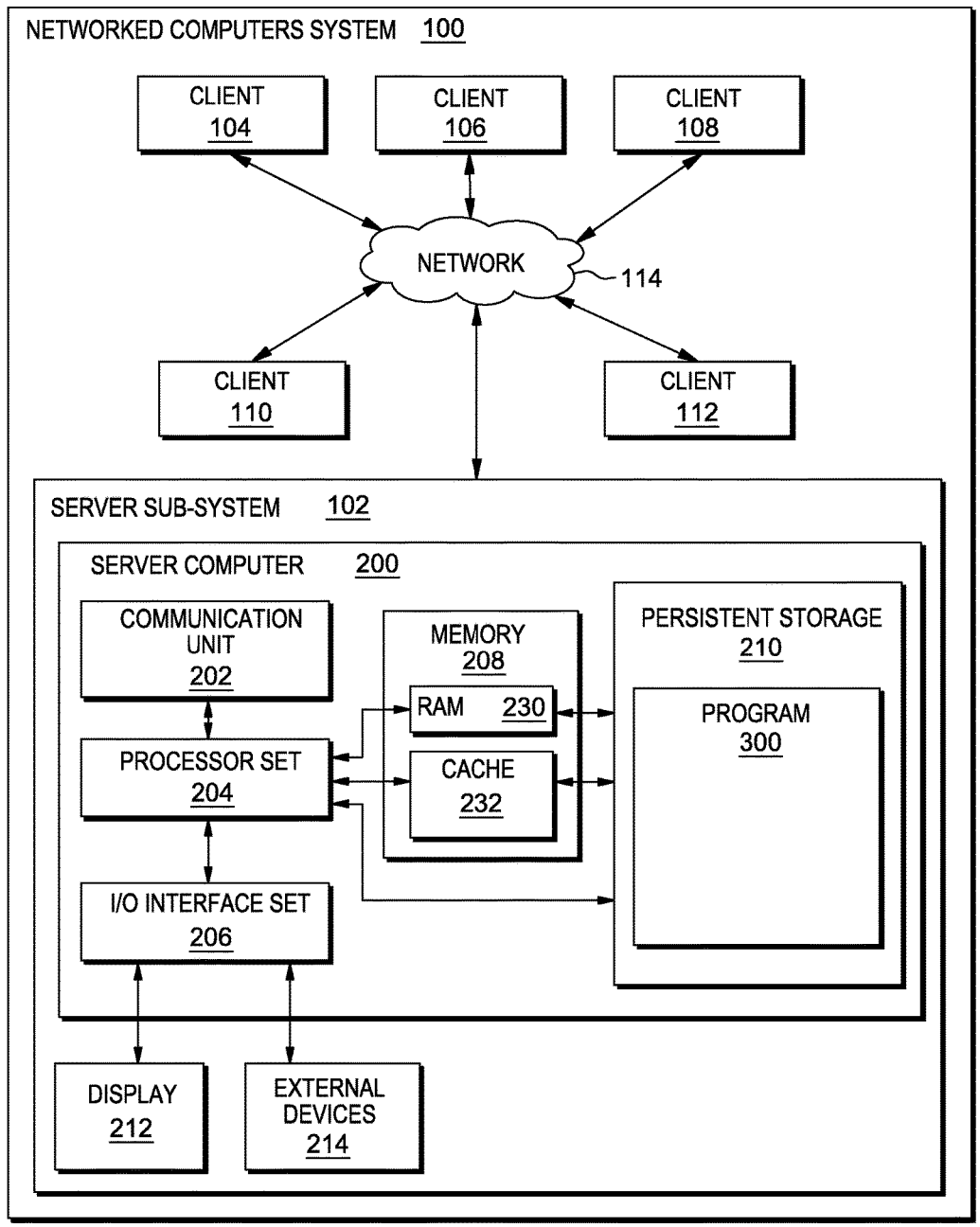
FIG. 1 is a schematic view of a first embodiment of a system according to the present invention.

In some embodiments of the present invention, resources are allocated, stolen, and relinquished from work rather than work being allocated to resources. Some embodiments of the present invention make an initial allocation of resources to job queues, then steal excess resources back and redistribute them to other job queues based on factors such as whether a queue permits stealing and whether a queue is enabled to steal. Stealing and redistributing resources in this fashion may improve system performance.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Figure 2:
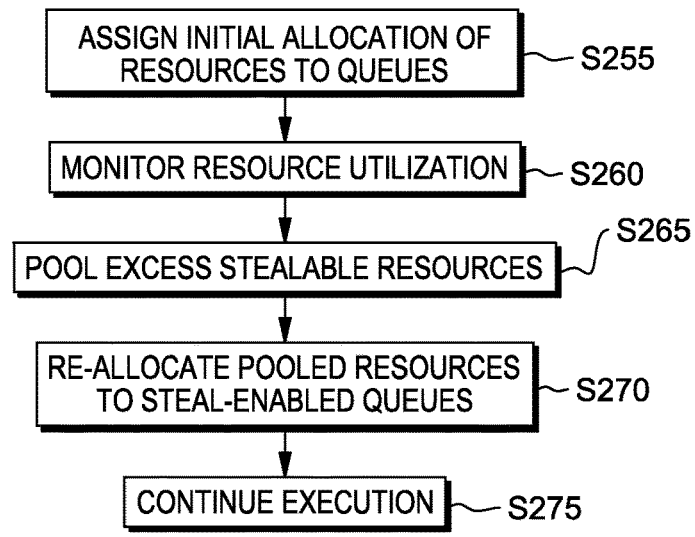
FIG. 2 is a flowchart showing a method performed, at least in part, by the first embodiment system.
Figure 3:
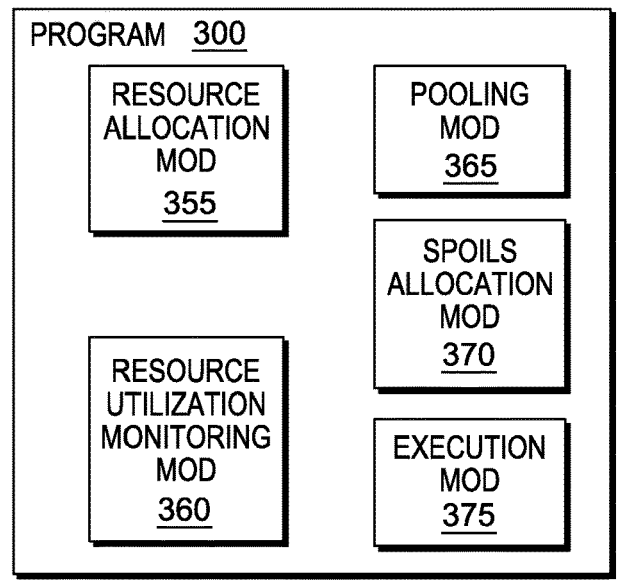
FIG. 3 is a schematic view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where resource allocation module ("mod") 355 assigns an initial allocation of resources to high-priority queue A and low-priority queue B. Each of these queues contains zero or more jobs waiting to be executed at any given time. Resources are assigned to the two queues based on each queue's respective pre-assigned relative resource weight. High-priority queue A has been assigned a relative resource weight of 0.7, while low-priority queue B has been assigned a relative resource weight of 0.3. There are 10 resources. Therefore, in this step, queue A receives 70% of the resources, or 7 resources, for its jobs, while queue B receives 30% of the resources, or 3 resources, for its jobs.

Those of skill in the art will recognize that other scenarios are possible. For instance, any number of queues could be present; each queue may have a relative resource weight for each type of fungible resource, such as CPU time or bytes of memory; and/or methods other than static, pre-assigned, relative resource weights may be used to make initial assignments of resources to queues, like assigning resources dynamically based on, though not necessarily in direct proportion to, the relative number of jobs in each queue at the time resources are assigned. The assignment at this step need not be an actual assignment, but may be only an accounting of what resources are to be designated for use by each queue.

Processing proceeds to step S260, where resource utilization monitoring mod 360 monitors the utilization of the resources allocated to each queue. Queue A currently has 10 jobs pending, while queue B currently has only 1 job pending. Each job needs only one resource. Therefore, resource utilization monitoring mod 360 observes that queue A is using all 7 of its allocated resources while queue B is using only 1 of its 3 allocated resources. Again other scenarios are possible. For example, some jobs may need more than one resource, and resource utilization monitoring mod may monitor not only resources used but also resources needed.

Processing proceeds to step S265, where pooling mod 365 pools excess resources from queues which allow stealing. Both queues A and B allow stealing, but only queue B has excess resources available to steal. Therefore, pooling mod 365 reclaims as unallocated the 2 resources allocated to, but unused by, queue B. In general, some queues may allow stealing while others may not, stealing may only occur if another queue has pending jobs in need of resources, and/or the amount of resources stolen from any given queue may depend on the number of resources needed by other queues, the total number of unused resources available to steal, and the "steal from" weight of that queue relative to the "steal from" weights of other queues that permit stealing. Also, queues may allow only a certain portion of their excess resources to be stolen, and this portion may be determined statically or dynamically based on factors such as queue priority, historic workload variability, absolute number of excess resources, number of excess resources relative to number of used resources, and so forth. Likewise, queues may be able to specify particular queues or particular characteristics of other queues for which they will permit stealing; for example, by using rules such as "only queues with a priority higher than mine may steal my resources" (and in such a scenario, resources reclaimed under such a rule may be tagged accordingly to ensure a reallocation compliant with the rule). As in step S255, this step may be an actual de-allocation of resources or just an accounting thereof.

Processing proceeds to step S270, where spoils allocation mod 370 takes the pooled excess resources and reallocates them to queues which are enabled to steal. Both queues A and B are enabled to steal, and each has a pre-defined relative resource stealing weight of 0.5. Therefore, spoils mod 370 allocates one stolen resource to queue A, while the other is reallocated to queue B. After this allocation, queue A has only 2 jobs without the resources it needs to execute instead of the 3 it had in this situation before, while all of queue B's jobs still have the resources they need to execute. In general, some queues may be enabled to steal while others may not be so enabled. Alternatively or in addition, other criteria could be used to allocate excess resources, such as whether or not a queue was stolen from (in which case resources might not be reallocated to it), relative queue priority, relative number of jobs without needed resources currently pending per queue, constraints attached to reclaimed resources, and so on.

Processing proceeds to step S275, where execution mod 375 continues execution of one or more of the queued jobs that have the resources they need to execute.

III. Further Comments and/or Embodiments

Some embodiments of the present invention recognize that in a system with a weighted resource allocation, where queues of work from 1 to x exist and where each queue has a weight in the range of 0 to 1, there needs to be a way to distribute extra, unused weight (resources) to other queues that may have work.

Some embodiments of the present invention may include one, or more, of the following features, characteristics and/or advantages: (i) a type of stealing that allows one or more queues to steal from one or more other queues; (ii) allow a redistribution of unused work while maintaining the original weighting of resources; (iii) allow lower-priority queues to "catch up" on work if they currently have a workload and other higher-priority queues have a load of work but aren't using all of their weighted resources; and/or (iv) result in better overall system throughput by not throttling lower-priority queues in a weighted resource distribution when the higher-priority queues have work but are not using all of their resources.

Figure 4:
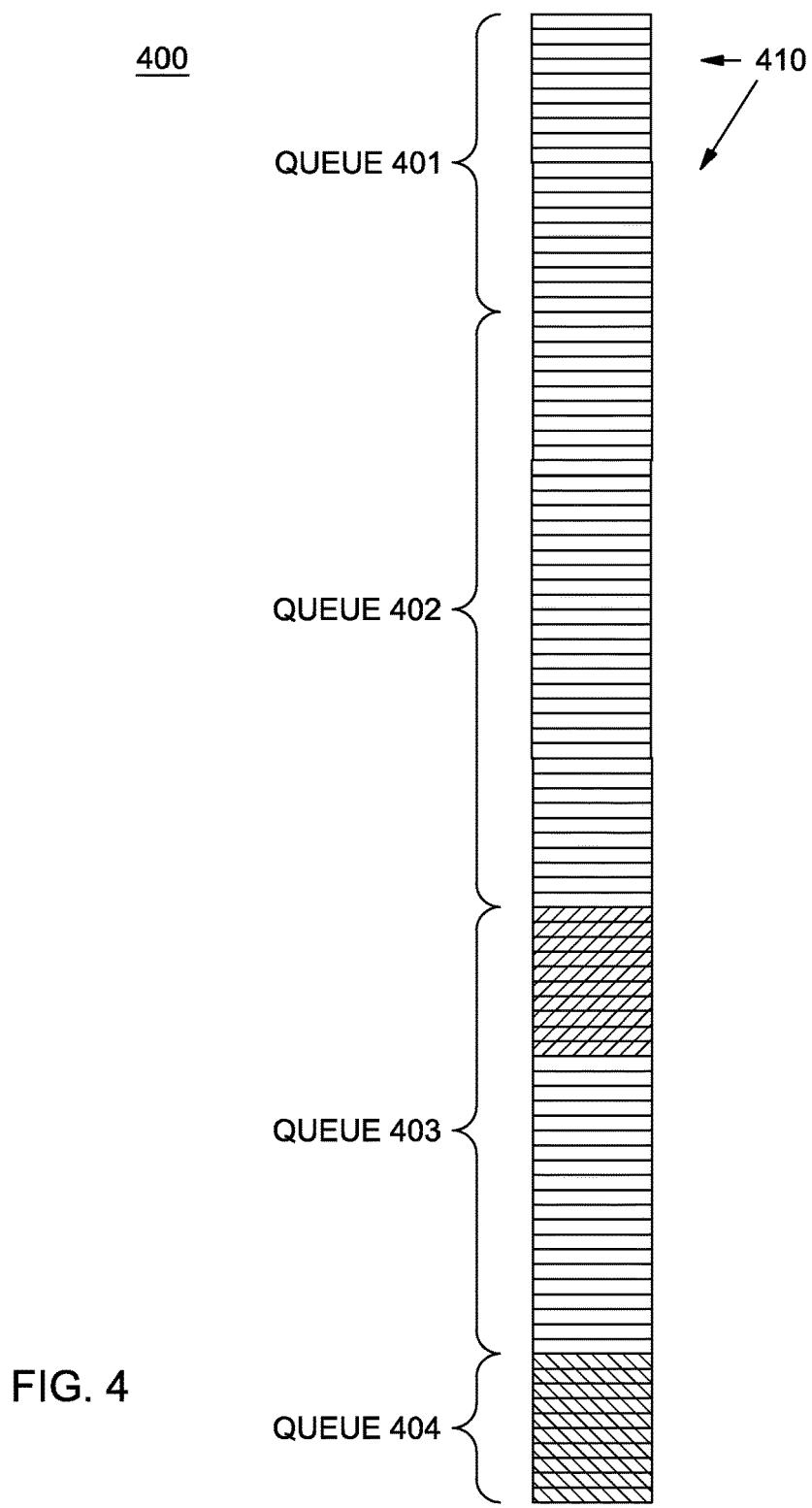
FIG. 4 is a first diagram of a second embodiment system.

Shown in FIG. 4 is system 400, having queues 401, 402, 403, and 404, as well as a weighted distribution of resources 410 among the four queues. The four queues have weights adding up to 1, with queue 401 assigned a weight of 0.2, queue 402 assigned a weight of 0.4, queue 403 assigned a weight of 0.3 and queue 404 assigned a weight of 0.1. This gives the queues 20%, 40%, 30%, and 10%, respectively, of available resources 410. Queues 403 and 404 have work. Because the resources here represent threads, queue 403 has 30 threads available for its work while queue 404 has 10 threads available for its work. Queue 403 has 10 jobs it is processing, so it uses 10 of its 30 allocated threads. Queue 404 also has 10 jobs it is processing, so it uses all 10 of its allocated threads. This situation effectively leaves 20 unused threads that are allocated to queue 403, while queue 404 has no available resources for processing new jobs. In such a situation, it may be desirable to enable queue 404 to take some unused threads from queue 403. More generally, it may be desirable to allow different queues that have work to steal from other queues that may or may not have work but aren't using their full set of allocated resources.

In some embodiments of the present invention, any queue can be flagged to allow stealing by other queues and/or for permission to steal from other queues. A given queue will only steal from other queues that allow stealing, and only if the given queue is allowed to steal. During each iteration to determine resource distribution, each queue is first allocated its full weight in resources. Then, if it is allowed to steal resources, it will analyze the work used by other queues and create a pool of resources available to be stolen from. Each queue that is allowed to steal has a resource stealing weight, so some queues can steal more than others.

Figure 5:
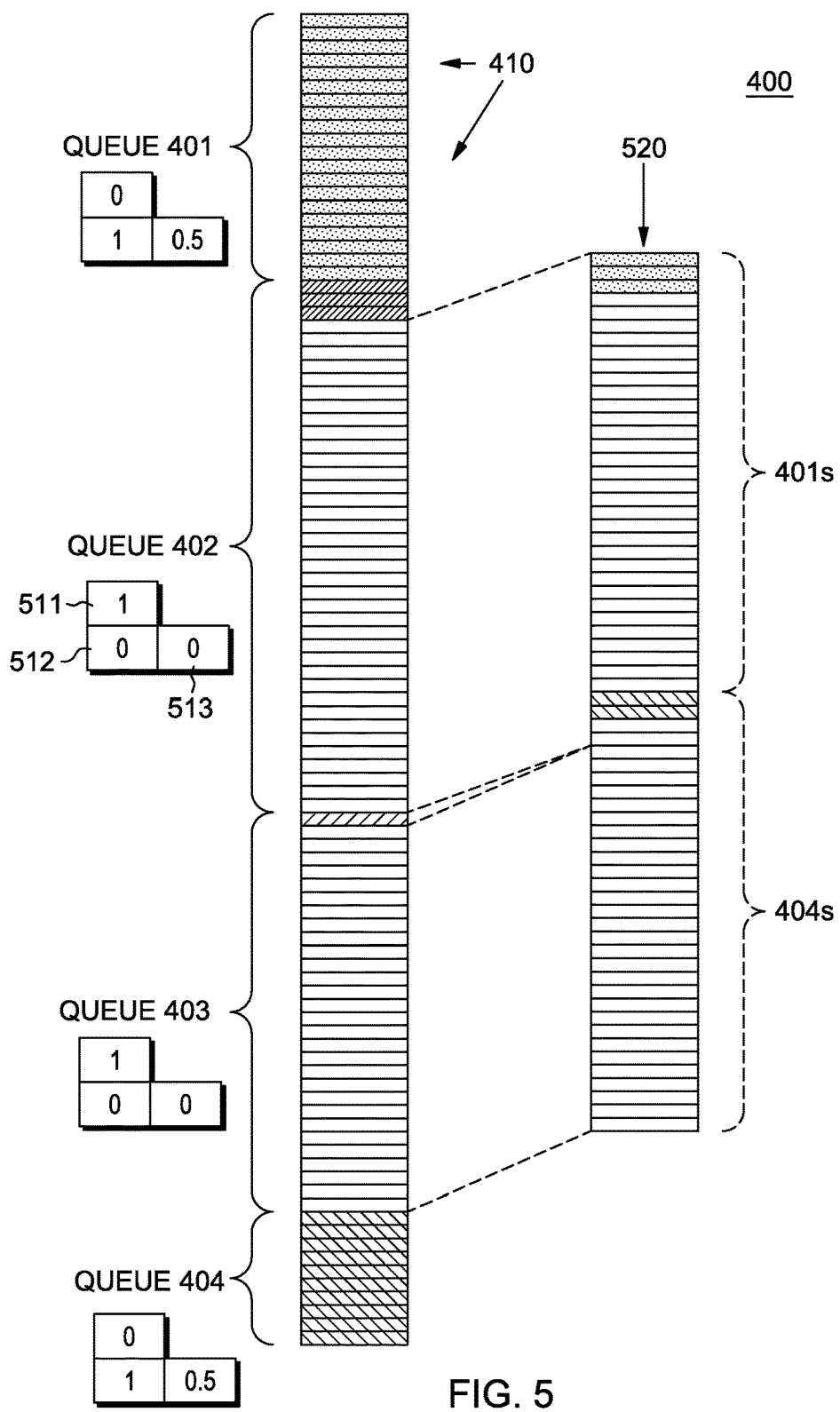
FIG. 5 is a second diagram of the second embodiment system.

Shown once more in FIG. 5 is system 400, again with queues 401, 402, 403, and 404 and resources 410. Also shown is stealable resource pool 520, including stolen resources 401s and 404s. Associated with each queue are: "steal from" flag 511; "can steal" flag 512; and resource stealing weight 513. Queues 401, 402, 403, and 404 still have weights of 0.2, 0.4, 0.3, and 0.1, respectively, which add up to 1 as before. Again this means that queue 401 has allocated to it 20% of resources 410, queue 402 has 40%, queue 403 has 30%, and queue 404 has 10%. In addition, as indicated by the "1" values in flags 511 and 512 of each queue, queues 401 and 404 are allowed to steal, while queues 402 and 403 can be stolen from. The current job distribution is as follows: queue 401 has 23 jobs; queue 402 has 3 jobs; queue 403 has 1 job; and queue 404 has 12 jobs.

In this job distribution queues 401 and 404 are behind in jobs, but are allocated fewer resources then queues 402 and 403, which have less work. Queues 401 and 404 are allowed to steal and have been assigned a stealing weight of 0.5 each, so they will each get an even split of stolen resources. Queues 402 and 403 can be stolen from, so their free resources are added up to produce stealable resource pool 520. Queue 402 is using 3 of its 40 allocated resources (threads) and queue 403 is using 1 of its 30 allocated threads, leaving 66 allocated but unused threads in stealable resource pool 520. This pool of unused threads/resources is split evenly between queues 401 and 404 in this round based on their stealing weights of 0.5 each. So 33 threads will be passed to each of queues 401 and 404 as stolen resources 401 and 404s, respectively, allowing these queues to catch up on their work. Had queues 402 and 403 both been using all of their threads, pool 520 would have been 0 and queues 401 and 404 would have received no extra threads.

It may help the reader to visualize people waiting in lines at a set of check-out registers. One might imagine a set of general-purpose lines and a set of express lines. The general-purpose lines have customers waiting, while the set of express lines have more cashiers than customers. Instead of having some of the customers waiting in the general-purpose lines move to the empty express lines to take advantage of the idle cashiers, the excess cashiers (perhaps equipped with hand-held scanners) temporarily move to the general-purpose lines to serve the people waiting there.

While in the example embodiments presented herein weights were selected that add up to 1, there is no general requirement that the numbers add up to 1, to 100, or to any particular number. It doesn't matter what the numbers are since they are just weighted to the sum total of them all. The weights are simply weighted averages, with allocations being made based on each weight relative to the sum total of all the weights. For example, suppose there are two queues, Q and P, with respective weights of 1 and 2. Further suppose there are 6 resources. Then Q will be allocated 2 resources (1 for every 3) and P will be allocated 6 resources (2 for every 3). If another 3 resources are added to the system, the relative allocations would remain unchanged, while the absolute allocations would become 3 and 6, respectively. Alternatively, suppose again the initial 6 resources but that at some point a new queue, R, is added with a weight of 3.

In this case, the new allocation would be 1 resource to Q (1 for every 6), 2 to P, and 3 to R. In this way a set of resources may be added or removed without changing the resource allocations of the entire system—the weightings simply implicitly change as a result of a change in the sum.

Some embodiments of the present invention may include one, or more, of the following features, characteristics and/or advantages: (i) move resources instead of moving work; (ii) allow work to maintain the properties associated with the queue which contains it; (iii) allow work to stick to the queue for which it was designated; (iv) move resources to a queue, which may contain many jobs, rather than moving resources to a specific job; (v) allow for various queue configurations, such as allowing a queue to steal or to be stolen from; (vi) are related to the concept of resource allocation, wherein a queue does not just get free resources, but is allocated dynamic resources depending on its allocation of those available resources and the current state of its workload in comparison to the other queues; and/or (vii) provide for weighted stealing of resources for application threads.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

What is claimed is:

1. A method comprising:
   receiving a plurality of work queues, where each given work queue of the plurality of work queues includes (i) a set of computing job(s), (ii) a set of computing thread(s) assigned to the given work queue to perform computing jobs, (iii) a first flag indicating whether the given queue can steal from a thread pool, and (iv) a second flag indicating whether the given queue can reassign unused thread(s) to the thread pool;
   monitoring each given work queue of the plurality of work queues for thread usage;
   for each given work queue of the plurality of each work queue, determining at least one work queue with an unused assigned thread(s) and a positive second flag based, at least in part, on the monitoring;
   reassigning the unused assigned thread(s) to the thread pool;
   for each given work queue of the plurality of work queues, determining at least one work queue with no unused thread(s) and a positive first flag;
   assigning thread(s) from the thread pool to at least one work queue of the plurality of work queues based, at least in part, on the determination of at least one work queue of the plurality of work queues having no unused assigned thread(s) and a positive first flag; and
   for at least one work queue of the plurality of work queues, executing at least one computing job of the set of computing job(s) using the assigned thread(s);
   wherein a given work queue having reassigned one or more unused assigned thread(s) to the thread pool cannot receive one or more thread(s) from the thread pool until recalling all thread(s) from the thread pool that were reassigned from the given work queue.

2. The method of claim 1, wherein:
   the set of computing thread(s) assigned to the given work queue to perform computing job(s) in an initial allocation is assigned based, at least in part, on a relative resource weight value, the relative resource weight value indicative of a relative portion of thread(s) assigned to the given work queue from an initial set of available thread(s);
   each work queue with a positive first flag also includes a steal weight value indicative of how many thread(s) of the thread pool can be assigned to it; and
   assigning thread(s) from the thread pool is based, at least in part, on the steal weight of a work queue receiving a thread from the thread pool.

3. The method of claim 2 wherein the steal weight for all work queues of the plurality of work queues must equal a total sum of 1.

4. The method of claim 1, wherein:
   each given work queue of the plurality of work queues has an assigned relative priority value indicative of relative priority of the given work queue compared to each other work queue of the plurality of work queues; and reassigned unused thread(s) from a given work queue cannot be reassigned to a work queue with a lower assigned relative priority value.

5. A computer program product (CPP) comprising:
a non-transitory machine readable storage device; and
computer code stored on the non-transitory machine readable storage device, with the computer code including instructions for causing a processor(s) set to perform operations including the following:
  receiving a plurality of work queues, where each given work queue of the plurality of work queues includes (i) a set of computing job(s), (ii) a set of computing thread(s) assigned to the given work queue to perform computing jobs, (iii) a first flag indicating whether the given queue can steal from a thread pool, and (iv) a second flag indicating whether the given queue can reassign unused thread(s) to the thread pool;
  monitoring each given work queue of the plurality of work queues for thread usage;
  for each given work queue of the plurality of each work queue, determining at least one work queue with an unused assigned thread(s) and a positive second flag based, at least in part, on the monitoring;
  reassigning the unused assigned thread(s) to the thread pool;
  for each given work queue of the plurality of work queues, determining at least one work queue with no unused thread(s) and a positive first flag;
  assigning thread(s) from the thread pool to at least one work queue of the plurality of work queues based, at least in part, on the determination of at least one work queue of the plurality of work queues having no unused assigned thread(s) and a positive first flag; and
  for at least one work queue of the plurality of work queues, executing at least one computing job of the set of computing job(s) using the assigned thread(s);
wherein a given work queue having reassigned one or more unused assigned threads to the thread pool cannot receive one or more thread(s) from the thread pool until recalling all thread(s) from the thread pool that were reassigned from the given work queue.

6. The CPP of claim 5, wherein:
the set of computing thread(s) assigned to the given work queue to perform computing jobs in an initial allocation is assigned based, at least in part, on a relative resource weight value, the relative resource weight value indicative of a relative portion of thread(s) assigned to the given work queue from an initial set of available thread(s);
each work queue with a positive first flag also includes a steal weight value indicative of how many thread(s) of the thread pool can be assigned to it; and
assigning thread(s) from the thread pool is based, at least in part, on the steal weight of a work queue receiving a thread from the thread pool.

7. The CPP of claim 6 wherein the steal weight for all work queues of the plurality of work queues must equal a total sum of 1.

8. The CPP of claim 5, wherein:
each given work queue of the plurality of work queues has an assigned relative priority value indicative of relative priority of the given work queue compared to each other work queue of the plurality of work queues; and
reassigned unused thread(s) from a given work queue cannot be reassigned to a work queue with a lower assigned relative priority value.

9. A computer system (CS) comprising:
a processor(s) set;
a machine readable storage device; and
computer code stored on the machine readable storage device, with the computer code including instructions for causing the processor(s) set to perform operations including the following:
  receiving a plurality of work queues, where each given work queue of the plurality of work queues includes (i) a set of computing job(s), (ii) a set of computing thread(s) assigned to the given work queue to perform computing jobs, (iii) a first flag indicating whether the given queue can steal from a thread pool, and (iv) a second flag indicating whether the given queue can reassign unused thread(s) to the thread pool;
  monitoring each given work queue of the plurality of work queues for thread usage;
  for each given work queue of the plurality of each work queue, determining at least one work queue with an unused assigned thread(s) and a positive second flag based, at least in part, on the monitoring;
  reassigning the unused assigned thread(s) to the thread pool;
  for each given work queue of the plurality of work queues, determining at least one work queue with no unused thread(s) and a positive first flag;
  assigning thread(s) from the thread pool to at least one work queue of the plurality of work queues based, at least in part, on the determination of at least one work queue of the plurality of work queues having no unused assigned thread(s) and a positive first flag; and
  for at least one work queue of the plurality of work queues, executing at least one computing job of the set of computing job(s) using the assigned thread(s);
wherein a given work queue having reassigned one or more unused assigned threads to the thread pool cannot receive one or more thread(s) from the thread pool until recalling all thread(s) from the thread pool that were reassigned from the given work queue.

10. The CS of claim 9, wherein:
the set of computing thread(s) assigned to the given work queue to perform computing jobs in an initial allocation is assigned based, at least in part, on a relative resource weight value, the relative resource weight value indicative of a relative portion of thread(s) assigned to the given work queue from an initial set of available thread(s);
each work queue with a positive first flag also includes a steal weight value indicative of how many thread(s) of the thread pool can be assigned to it; and
assigning thread(s) from the thread pool is based, at least in part, on the steal weight of a work queue receiving a thread from the thread pool.

11. The CS of claim 10 wherein the steal weight for all work queues of the plurality of work queues must equal a total sum of 1.

12. The CS of claim 9, wherein:
each given work queue of the plurality of work queues has an assigned relative priority value indicative of relative priority of the given work queue compared to each other work queue of the plurality of work queues; and reassigned unused thread(s) from a given work queue cannot be reassigned to a work queue with a lower assigned relative priority value.

* * * * *